INVENTOR:
Balthasar Lindner

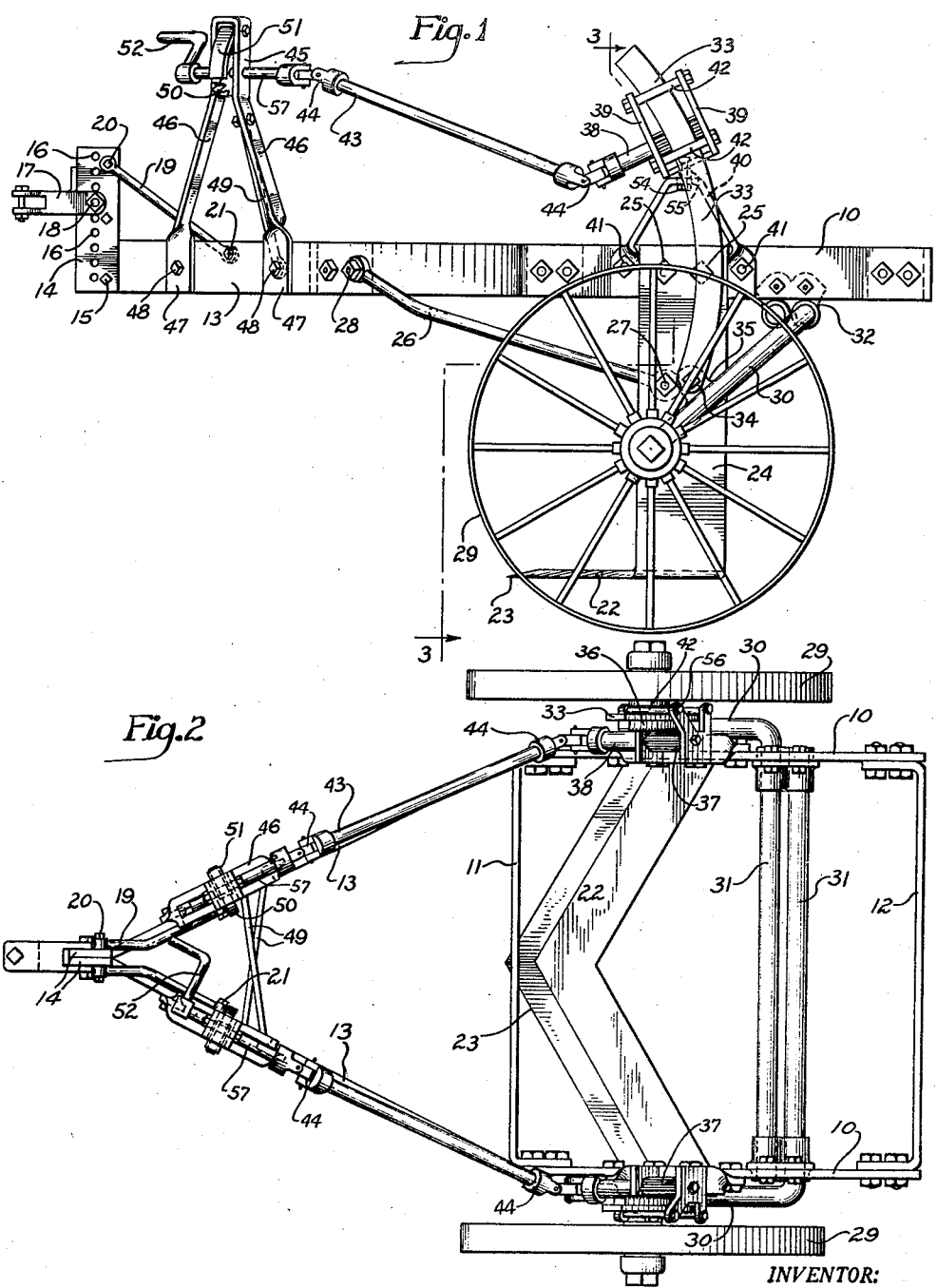

Patented Apr. 3, 1951

2,547,400

UNITED STATES PATENT OFFICE 2,547,400

TAP ROOT CUTTER

Balthasar Lindner, Palatine, Ill.

Application June 2, 1947, Serial No. 751,880

5 Claims. (Cl. 97—101)

This invention relates in general to an agricultural implement for stirring or loosening the soil, to plow deeply or for rooting by cutting, severing or tearing through stubs and roots of trees, plants, brushes, or the like, preferably below the surface of the ground.

The invention is more particularly described as a tap root cutter which has a blade movable below the surface of the ground for severing the main or tap roots of small trees such as evergreens, which tend to grow downwardly to great lengths so that they are usually severed about once a year to prevent the tap root from extending too deeply into the ground.

An important object of the invention is to provide an implement of this kind mounted upon wheels and adapted to be drawn by a tractor or other source of power.

A further object of the invention is to provide a wheeled mounting for the implement which may be adjusted in height or depth of cut at either or both sides of the implement by varying the position of the supporting wheel or wheels.

A still further object of the invention is to provide means for adjusting the height of each wheel from the front of the implement adjacent its connection with a tractor or other vehicle so that the adjustment may be made without the necessity of stopping the movement of the vehicle by making the adjustment from the tractor or the front of the implement.

Still a further object of the invention is to provide a blade or cutter which is supported at the sides of the vehicle and has an angular forward extension therefrom adapted to pass through and under the ground more easily and to effect the desired cutting operation with greater certainty and requiring a minimum of power.

Other objects of the invention will appear in the specification and will be apparent from the accompanying drawings in which, Fig. 1 is a side elevation of a tap root cutter in accordance with the principles of this invention;

Fig. 2 is a top plan view of the cutter shown in Fig. 1;

Figure 3:
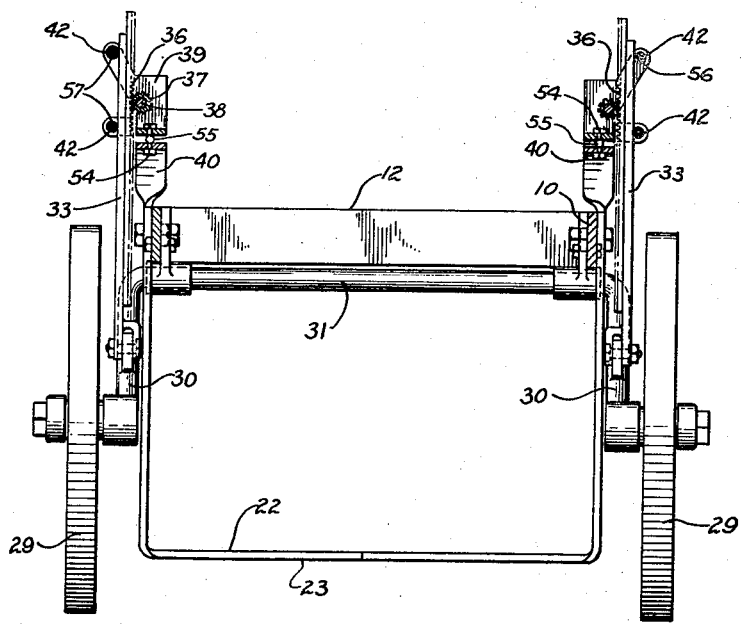
Fig. 3 is a sectional view of the cutter as taken on the line 3—3 of Fig. 1.

This implement provides a blade adapted to cut below the surface of the ground and supported at the sides of the blade so that either one or both ends thereof may be independently or jointly raised and lowered, the movement of the blade through and below the surface of the ground being particularly adapted to sever the long tap roots of small trees, shrubs, and the like.

The use and application of this implement is found particularly in preventing the tap roots of certain trees from becoming too deeply rooted which is a detriment when they are to be transplanted for landscaping and other commercial and artistic purposes. Usually the roots are included with a ball of earth for transplanting and if the tap root is allowed to grow to too great a depth, the labor of digging the tree for transplanting is too great and too expensive. Heretofore it has been the practice to dig up the small trees every year, removing the lower end of the tap root and then to replant them for continued growth until they are sold for transplanting.

The present implement provides means for severing the tap root without uprooting or transplanting the tree and thus effects a great saving in time and labor wherever it is used.

Referring now more particularly to the drawings, a solid metal frame has substantially parallel side pieces 10 connected by a front cross piece 11 and a back cross piece 12. The side pieces have angular extensions 13 at the front terminating in adjacent vertical ends 14 secured together by fastening bolts 15. Extending through the ends 14 is a vertical row of holes 16 to receive a draw bar clevis 17 which may be attached through any of the holes by a fastening bolt 18.

With this construction, the clevis may be raised or lowered to connect the implement to a suitable source of power preferably a tractor. A brace 19 is connected at one end to the upper portion of end 14 by a fastening bolt 20 and the lower end of the brace is connected by a bolt 21 extending through the frame extension 13 near the front end thereof.

A cutter blade 22 has a central forwardly extending angular portion 23 and the blade is mounted at its ends below the side pieces 10 by side bars 24 preferably formed as continuations of the ends of the blade and firmly attached to the sides by fastening bolts 25. To additionally support the side bars in the frame, a brace 26 is provided at each side, one end of each brace being connected to the side bar by a fastening bolt 27, the side bar being bent forwardly to conform with the inclined frame extension 13 and having a fastening bolt 28 connecting the frame end of the brace to the frame extension.

A supporting wheel 29 is provided for each side of the frame, each wheel being mounted at the end of a crank 30, one axle portion 31 of the crank being mounted in bearings 32 at the under sides of the side pieces 10. Thus each wheel is separately mounted upon a crank pivoted in the side piece so that each wheel may be separately raised and lowered in the frame.

In order to maintain each wheel in fixed position and also to raise and lower it as desired, a bar 33, preferably curved or having a curved portion, is pivotally connected at its lower end by a fastening bolt 34 to a projection 35 near the lower end of the crank 30. At one side of the upper end of the bar is a rack 36 engaged by a pinion 37 at the end of a short shaft 38. The shaft extends through side plates 39 connected by a bottom cross-piece 53 supported at the upper end of a bracket 40 by means of a bolt 54 having an intermediate ball portion 55 engaging the cross-piece and the top of the bracket 40, allowing the cross piece and plates 39 to rock a limited amount on the bracket. The lower ends of bracket 40 are divergent and connected by bolts 41 to the adjacent side pieces 10 preferably beyond opposite edges of the blade supporting bar 24.

Extending between the side plates 39 are rollers 42 mounted to rotate on bolts 56 connected through the side plates, the rollers engaging the flat side of the bar 33, thus holding the rack in engagement with the pinion 37 and allowing free movement of the rack bar. Connecting the end of each shaft 38 with an angular extending shaft 43 is a limited universal connector 44. The other end of shaft 43 is similarly connected by another limited universal connector 44 with a short shaft 57 mounted in a yoke 45 having upper parallel portions connected by diverging legs 46 with twisted extremities 47 secured to the adjacent side frame extension 13 by bolts 48. One of the diverging legs 46 is preferably connected to the opposite side frame extension by a stiffening brace 49. Between the parallel portions of the yoke, a ratchet gear 50 is mounted on the shaft 57 and a holding dog 51 is pivoted at the upper end of the yoke and engages the teeth of the ratchet gear for holding it in any adjusted position.

At the forward end of the shaft 57 which projects through the yoke 45 is a crank 52 by which the shaft may be turned. The crank is thus located near the adjacent end of the implement and the same crank is removable and used for either of the shafts 57. The double limited universal connection permits a limited rocking movement of the short shaft 38 and its mounting plates 39, and makes a smoother adjusting connection between the short shafts 38 and 57.

With this construction, the rotation of either shaft 57 will produce a corresponding rotation of its pinion 37 which will raise or lower the corresponding rack 36 attached to the bar 33 which is pivoted to the crank 30, thereby raising or lowering the wheel axis with respect to the frame and with respect to the cutter blade 22. For unequal ground, it may be desired to raise one wheel and lower the other and when the blade is not in use, both of the wheels may be lowered relative to the frame to free the blade from contact with the ground.

Figure 4:
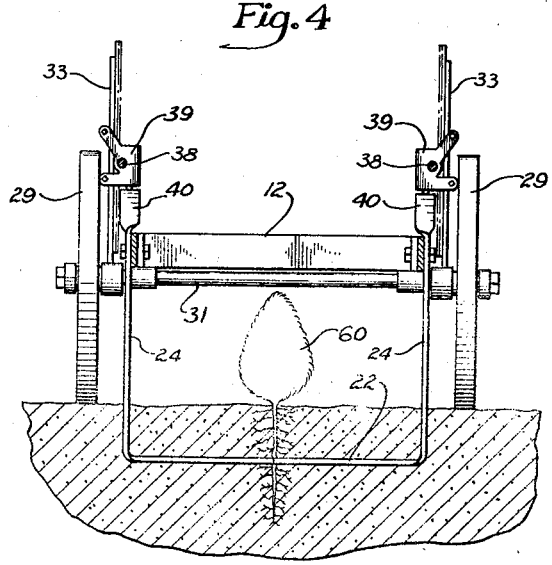
Fig. 4 is an elevational view showing how the implement is used in cutting the tap roots of small trees such as evergreens.

In using the implement for cutting the tap roots of small trees 60 as shown in Fig. 4, the wheels 29 will be raised relative to the frame and to the blade 22 so that the latter will pass below the surface of the ground engaging the tap roots at the predetermined depth. As the implement is moved along, it will pass over the tops of the shrubs or trees without damaging them, and the cutter blade will sever the tap roots. As these trees are usually planted in regular furrows or rows, the implement will pass rapidly along a row of trees cutting the tap roots without otherwise damaging or displacing the trees, and making it unnecessary to dig up the trees, to cut off tap roots and to again replant the trees.

Although the construction and operation of this implement has been described in detail as it relates to cutting tap roots, it should be regarded by way of illustration and example rather than as a limitation or restriction of the invention, as various changes may be made in the construction, combination and arrangement of the parts without departing from the spirit and scope of the invention.

I claim:

1. In a tap root cutter, a wheeled frame having a front angular frame extension, a crank for mounting each wheel in the frame, a bar engaging the crank near the wheel for raising and lowering it, a rack carried by the bar, a pinion in engagement with the rack, the bar and rack being curved in an arc to raise and lower the crank, a frame rotatably mounting the pinion, means mounting the pinion frame for rocking movement upon the wheeled frame, and shaft means extending to the front of the angular frame and connected to the pinion for raising and lowering each wheel separately.

2. In a tap root cutter, a two wheeled frame having an angular converging front extension, a crank for each wheel mounted in the frame, a bar having a curved portion extending upwardly from each crank, a rack carried by the bar, a pinion engaging the rack, a short shaft upon which the pinion is mounted, means mounting the pinion and shaft for limited rocking movement on the wheeled frame, and jointed shaft means extending from the pinion and short shaft mounting means to the converging portion of the angular front extension for rotating the pinion and adjusting the position of the wheel.

3. In a tap root cutter, a two wheeled frame having an angular converging front extension, a crank for each wheel mounted in the frame, a bar connected to the crank and having a curved upper portion extending above the frame, a rack carried by the bar, a pinion mounted in on a short shaft and engaging the rack, an open frame comprising side bars and a connected cross piece in which the pinion and short shaft are mounted, a yoke secured to the wheeled frame, means comprising a bolt connecting the yoke and said open frame with a ball portion between them upon which the open frame may be rocked for connecting the rack and pinion, and operating shaft connections to the angular front extension comprising limited universal connectors, and a confined front short shaft section rotatable from the front extension for raising and lowering the corresponding wheel.

4. In a tap root cutter, a two wheeled frame having a converging front portion, a crank for mounting each wheel in the frame, a bar engaging the crank near the wheel for raising and lowering it, a rack carried by the bar, a pinion in engagement with the rack, rollers engaging the back of the bar for holding the rack against the pinion, and jointed shaft means connected to the pinion and extending to the converging frame end of the machine for raising and lowering each wheel separately relative to the frame.

5. In a tap root cutter, a wheeled frame, a pair of wheels each mounted upon a crank at one side of the frame, a rack and pinion device for raising and lowering each wheel separately, connected shaft sections for rotating the pinion, one of the shaft sections being mounted in a yoke at the front of the frame, the yoke having parallel portions between which a gear is mounted on the shaft, a locking dog engaging the gear, and a crank attachable at the end of the shaft for rotating the connected shafts and raising and lowering the wheel.

BALTHASAR LINDNER.

REFERENCES CITED

The following references are of record in the file of this patent:

UNITED STATES PATENTS

| Number | Name | Date |
| --- | --- | --- |
| 1,014,470 | Heer | Jan. 9, 1912 |
| 1,720,691 | Printz | July 16, 1929 |
| 2,154,970 | Briggs | Apr. 18, 1939 |
| 2,345,702 | Noble | Apr. 4, 1944 |